(12) United States Patent
Chitragar et al.

(10) Patent No.: US 9,984,371 B2
(45) Date of Patent: May 29, 2018

(54) PAYMENT DE-TOKENIZATION WITH RISK EVALUATION FOR SECURE TRANSACTIONS

(71) Applicant: CA, INC., New York, NY (US)

(72) Inventors: Mahesh Malatesh Chitragar, Bangalore (IN); Dhivya Kalyanasundaram, Bangalore (IN); Sharath Lakshman Kumar, Bangalore (IN); Vishwanatha Salian, Bangalore (IN)

(73) Assignee: CA, INC., New York, NY (US)

( * ) Notice: Subject to any disclaimer, the term of this patent is extended or adjusted under 35 U.S.C. 154(b) by 458 days.

(21) Appl. No.: 14/670,657

(22) Filed: Mar. 27, 2015

(65) Prior Publication Data
US 2016/0283942 A1 Sep. 29, 2016

(51) Int. Cl.
G06Q 20/40 (2012.01)
G06Q 20/32 (2012.01)
G06Q 20/38 (2012.01)
G06Q 20/20 (2012.01)

(52) U.S. Cl.
CPC ....... *G06Q 20/4016* (2013.01); *G06Q 20/204* (2013.01); *G06Q 20/327* (2013.01); *G06Q 20/385* (2013.01)

(58) Field of Classification Search
CPC ........ G06Q 20/40; G06Q 20/00; G06Q 20/38; G06Q 20/32
USPC .............................................. 705/21, 44, 67
See application file for complete search history.

(56) References Cited

U.S. PATENT DOCUMENTS

| | | | | |
|---|---|---|---|---|
| 9,780,953 B2 * | 10/2017 | Gaddam | ............... | H04L 9/3263 |
| 2003/0163427 A1 * | 8/2003 | Fung | ....................... | G06Q 30/02 |
| | | | | 705/51 |
| 2003/0191709 A1 * | 10/2003 | Elston | .................... | G06Q 20/04 |
| | | | | 705/40 |
| 2006/0143462 A1 * | 6/2006 | Jacobs | .................... | G06F 21/64 |
| | | | | 713/181 |
| 2006/0202012 A1 * | 9/2006 | Grano | .................... | G06Q 20/04 |
| | | | | 235/379 |
| 2009/0089869 A1 * | 4/2009 | Varghese | ................ | G06F 21/31 |
| | | | | 726/7 |
| 2012/0023567 A1 * | 1/2012 | Hammad | ............... | G06Q 20/12 |
| | | | | 726/9 |
| 2012/0041881 A1 * | 2/2012 | Basu | ..................... | G06Q 20/02 |
| | | | | 705/67 |
| 2012/0246079 A1 * | 9/2012 | Wilson | ................ | H04L 63/0807 |
| | | | | 705/67 |
| 2014/0019358 A1 * | 1/2014 | Priebatsch | ........... | G06Q 20/322 |
| | | | | 705/44 |

(Continued)

*Primary Examiner* — Oluseye Iwarere
(74) *Attorney, Agent, or Firm* — Sage Patent Group

(57) ABSTRACT

Methods of de-tokenizing secure payment tokens are disclosed. A method according to some embodiments includes receiving a request from an issuer to de-tokenize a secure payment token associated with a transaction conducted using a mobile terminal, generating a metric indicative of a risk of de-tokenizing the secure payment token, comparing the metric indicative of the risk of de-tokenizing the secure payment token to a predetermined threshold, and transmitting a response to the request to de-tokenize the secure payment token, wherein the response is based on the comparison of the metric indicative of the risk of de-tokenizing the secure payment token with the predetermined threshold.

16 Claims, 7 Drawing Sheets

(56) References Cited

U.S. PATENT DOCUMENTS

| | | | |
|---|---|---|---|
| 2014/0040145 A1* | 2/2014 | Ozvat | G06Q 20/401 705/64 |
| 2014/0040148 A1* | 2/2014 | Ozvat | G06Q 20/3829 705/71 |
| 2014/0067677 A1* | 3/2014 | Ali | G06Q 20/02 705/44 |
| 2014/0108263 A1* | 4/2014 | Ortiz | G06Q 20/3278 705/71 |
| 2014/0279552 A1* | 9/2014 | Ortiz | G06Q 20/3278 705/65 |
| 2014/0279554 A1* | 9/2014 | Priebatsch | G06Q 20/322 705/67 |
| 2014/0279556 A1* | 9/2014 | Priebatsch | G06Q 20/322 705/67 |
| 2015/0032625 A1* | 1/2015 | Dill | G06Q 20/385 705/44 |
| 2015/0100477 A1* | 4/2015 | Salama | G06Q 20/405 705/39 |
| 2015/0100495 A1* | 4/2015 | Salama | G06Q 20/405 705/65 |
| 2015/0112871 A1* | 4/2015 | Kumnick | G06Q 20/382 705/67 |
| 2015/0120559 A1* | 4/2015 | Fisher | G06Q 20/4014 705/44 |
| 2015/0178724 A1* | 6/2015 | Ngo | H04L 9/0869 705/71 |
| 2015/0180836 A1* | 6/2015 | Wong | H04L 9/0869 713/172 |
| 2015/0186879 A1* | 7/2015 | Ortiz | G06Q 20/3278 705/71 |
| 2015/0235212 A1* | 8/2015 | Ortiz | G06Q 20/40 705/44 |
| 2015/0339664 A1* | 11/2015 | Wong | H04L 9/3234 705/71 |
| 2016/0028550 A1* | 1/2016 | Gaddam | H04L 9/3263 713/173 |
| 2016/0071094 A1* | 3/2016 | Krishnaiah | G06Q 20/363 705/66 |
| 2016/0092872 A1* | 3/2016 | Prakash | G06Q 20/3829 705/65 |
| 2016/0140545 A1* | 5/2016 | Flurscheim | G06Q 20/3821 705/76 |
| 2016/0148197 A1* | 5/2016 | Dimmick | G06Q 20/3674 705/67 |
| 2016/0217452 A1* | 7/2016 | Wong | H04L 9/0869 |
| 2016/0224976 A1* | 8/2016 | Basu | G06Q 20/02 |
| 2016/0224977 A1* | 8/2016 | Sabba | G06Q 20/385 |
| 2016/0224983 A1* | 8/2016 | Cash | G06Q 20/40145 |
| 2016/0239833 A1* | 8/2016 | Venugopalan | G06Q 20/20 |
| 2016/0260079 A1* | 9/2016 | Lacoss-Arnold | G06Q 20/20 |
| 2016/0260096 A1* | 9/2016 | Lacoss-Arnold | G06Q 20/382 |
| 2016/0260097 A1* | 9/2016 | Nadella | G06Q 20/405 |
| 2016/0277380 A1* | 9/2016 | Wagner | H04L 63/0861 |
| 2016/0283942 A1* | 9/2016 | Chitragar | G06Q 20/4016 |
| 2016/0302065 A1* | 10/2016 | Bansal | H04W 12/06 |
| 2016/0307183 A1* | 10/2016 | Faith | G06Q 20/223 |
| 2016/0358163 A1* | 12/2016 | Kumar | G06Q 20/3823 |
| 2016/0379208 A1* | 12/2016 | Deliwala | G06Q 20/363 705/67 |
| 2017/0053260 A1* | 2/2017 | Zhou | G06Q 20/00 |
| 2017/0076272 A1* | 3/2017 | Zhou | G06Q 20/3221 |
| 2017/0243195 A1* | 8/2017 | Xing | G06Q 20/3278 |
| 2017/0338965 A1* | 11/2017 | Gaddam | H04L 63/0807 |

* cited by examiner

PAYMENT DE-TOKENIZATION WITH RISK EVALUATION FOR SECURE TRANSACTIONS

BACKGROUND

The present disclosure relates to computing systems, and, in particular, to computing system supporting secure payment through tokenization.

As payments technology evolves, new types of payment systems and techniques are being used to provide increased protection against counterfeit, account misuse, and other types of fraud. One technique that has been used is known as payment tokenization, which involves substituting a payment Primary Account Number (PAN) with a payment token in the payments ecosystem. Payment tokens may be used to originate payment transactions, while non-payment tokens may be used for other purposes, such as loyalty program tracking. A payment token service provider may be authorized to provide payment tokens to token requestors, such as card on file merchants, acquirer processors, payment gateways, digital wallet providers, card issuers, and the like. The token service provider may be implemented to run on a server and to receive requests for payment tokens from one or more token requestors. For each payment token request, the token service provider generates a random payment token, which is in some cases a Bank Identification Number (BIN)/Issuer Identification Number (IIN) range that is not currently being used by any active payment card. The token may be given some expiration period and can be used in place of the PAN for a payment card until it expires.

The process of generating a token from a sensitive data element, such as a PAN, is referred to as tokenization. De-tokenization is the reverse process of redeeming a token for its associated sensitive data element. For example, de-tokenization may refer to the process of obtaining a PAN corresponding to a token.

SUMMARY

Some embodiments provide methods of de-tokenizing secure payment tokens. A method according to some embodiments is performed on a processor and includes receiving a request from an issuer to de-tokenize a secure payment token associated with a transaction conducted using a mobile terminal, generating a metric indicative of a risk of de-tokenizing the secure payment token, comparing the metric indicative of the risk of de-tokenizing the secure payment token to a predetermined threshold, and transmitting a response to the request to de-tokenize the secure payment token, wherein the response is based on the comparison of the metric indicative of the risk of de-tokenizing the secure payment token with the predetermined threshold.

A method according to further embodiments may include receiving a request from an issuer to de-tokenize a secure payment token associated with a transaction conducted using a mobile terminal, receiving a first geographic location of the mobile terminal, receiving a second geographic location of a point of sale terminal associated with the transaction, receiving an authentication code from the mobile terminal, verifying the request to de-tokenize the secure payment token in response to the first geographic location, the second geographic location and the authentication code, and in response to verifying the request, de-tokenizing the secure payment token to obtain a primary account number, and transmitting the primary account number to the issuer.

A computer program product according to some embodiments includes a tangible computer readable storage medium comprising computer readable program code embodied in the medium that when executed by a processor causes the processor to perform operations including receiving a request from an issuer to de-tokenize a secure payment token associated with a transaction conducted using a mobile terminal, generating a metric indicative of a risk of de-tokenizing the secure payment token, comparing the metric indicative of the risk of de-tokenizing the secure payment token to a predetermined threshold, and transmitting a response to the request to de-tokenize the secure payment token, wherein the response is based on the comparison of the metric indicative of the risk of de-tokenizing the secure payment token with the predetermined threshold.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

Other types of terminals may include fixed terminals, such as automatic teller machines, point of sale terminals, etc.

Figure 1:
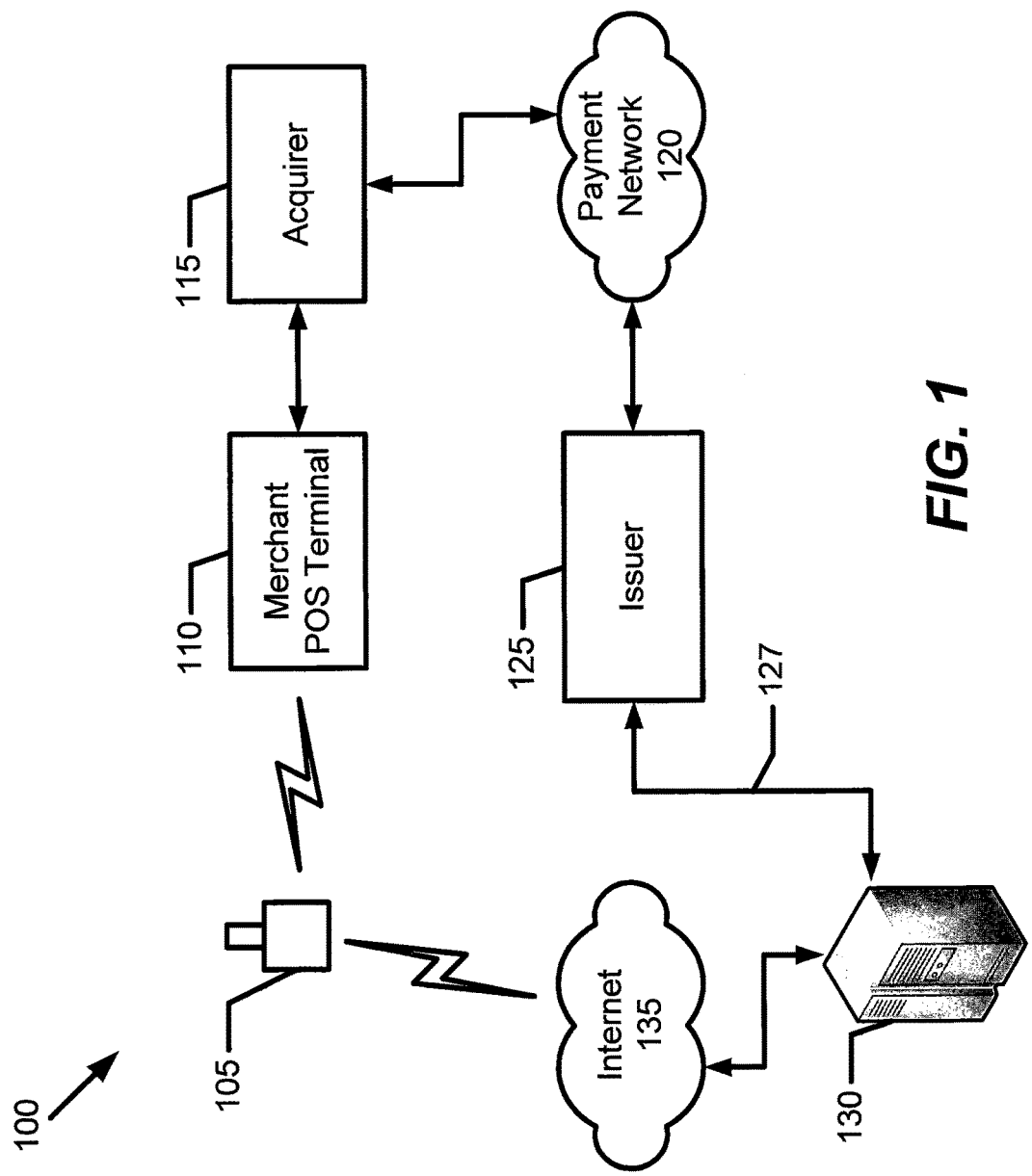
FIG. 1 is a block diagram of a system for facilitating secure payment transactions via tokenization in accordance with some embodiments of the inventive subject matter.

FIG. 1 is a block diagram that illustrates a system for facilitating secure payment transactions via tokenization according to some embodiments of the inventive subject matter. The system 100 comprises a Point Of Sale (POS) terminal 110 that may be operated, for example, in the store of a retailer or merchant. The POS terminal 110 may include a cash register that is managed by an attendant or may be a self-checkout register. The POS terminal 110 may be configured to scan products and read product codes. For example, the POS terminal 110 can be configured to read a UPC product bar code and/or a QR code. In some embodiments, the POS terminal 110 can be configured to scan and read other identifiers (i.e., codes) representative of a product. Once the products are scanned and read, the POS terminal 110 can be configured to generate transaction data and to receive payment associated with the products and/or services listed in the transaction data. The POS terminal 110 may receive payment from a shopper in a variety of ways including, but not limited to, cash, credit card, debit card, gift card, loyalty card, and reward card. The POS terminal 110 may be configured with communication functionality, such as Near Field Communication (NFC) functionality to receive payment information from a customer.

The POS terminal may be a fixed terminal that is associated with a known geographic location. The geographic location of the POS terminal 110 may be known to the an acquirer server/data processing system 115, which represents the merchant's bank or other type of financial institution for processing payments received by the merchant, to which the POS terminal 110 is connected. In some embodiments, however, the POS terminal 110 may be a mobile terminal that is not tied to a particular geographic location. In that case, the POS terminal 110 may have the capability determine its geographic location using, for example, a GPS receiver. A coarse location of the POS terminal 110 may also be obtained via geolocation based on an IP address associated with the POS terminal 110. IP address based geolocation techniques are well known in the art. However, IP address based geolocation techniques may be unreliable when, for example, the POS terminal 110 uses a virtual private network (VPN) to communicate. When a VPN is used, the POS terminal 110 may have an IP address associated with a VPN server that may be located far away from the location of the POS terminal 110. Thus, when geolocation techniques based on IP address are used, the POS terminal 110 may appear to be located at a different location than the actual physical location of the terminal.

When a transaction is conducted at the POS terminal 110, a shopper may provide payment information to the POS terminal 110 using a mobile device 105 that may include links to financial accounts thereon and/or data identifying various financial accounts, such as credit card accounts, store credit accounts, debit card accounts, checking accounts, loyalty program accounts, rewards accounts, and the like. The mobile device 105 may also include identification credentials, such as a photo identification, driver's license, passport, insurance card, home and/or work address information, home and/or work telephone numbers, and the like. In some embodiments, the financial information and/or personal identification information may be managed using a digital wallet application residing on the phone or in a cloud server on the Internet or other network.

The mobile device 105 may be configured to make a payment by obtaining a secure payment token locally to take the place of the PAN in the financial transaction. In conventional payment systems in which payment tokens are used, the mobile device 105 contacts a token server 130 to request a secure payment token. In some cases, the mobile device 105 may be pre-populated with secure payment tokens issued by the token server 130, and may not need to contact the token server 130 to obtain a secure payment token at the time of the transaction.

The acquirer server 115 is coupled to the issuer server/data processing system 125 via a payment network 120. The issuer server 125 may represent any institution providing a source of funds for a shopper's financial transaction including, but not limited to, banks, credit unions, retailers (e.g., store credit accounts/charge cards), mobile payment processors, such as Payfone™, and other financial institutions. It will be understood that the credit issuer may provide funds both through credit accounts and non-credit accounts, including a shopper's savings and/or checking account. The acquirer server 115 is coupled to the issuer server 125 via a payment network 120, which may be operated by an entity associated with the particular instrument used in a financial transaction. Such entities may include, but are not limited to, financial institutions, such as Visa, MasterCard, American Express, Discover Card, and the like who issue credit cards, debit cards, and other types of financial instruments used in financial transactions.

The connections between the mobile device 105, POS terminal 110, acquirer server 115, issuer server 125, and token server 130 may include wireless and/or wireline connections and may be direct or include one or more intervening local area networks, wide area networks, and/or the Internet. The payment network 120 may be a global network, such as the Internet or other publicly accessible network. Various elements of the payment network 120 may be interconnected by a wide area network, a local area network, an Intranet, and/or other private network, which may not be accessible by the general public. Thus, the payment network 120 may represent a combination of public and private networks or a virtual private network (VPN). The payment network 120 may be a wireless network, a wireline network, or may be a combination of both wireless and wireline networks.

The issuer server 125 is coupled to the token server 130 via a secure connection 127. The secure payment token generated by the mobile device 105 is communicated to the issuer server 125 through the payment network 120. The issuer server 125, however, cannot determine the actual PAN used in the financial transaction from the secure payment token. The process of recovering a PAN based on a secure payment token that represents the PAN is referred to as "de-tokenization."

To de-tokenize the secure payment token, the issuer server 125 transmits the secure payment token to the token server 130 over a secure communication connection using, for example, Transport Layer Security (TLS) or Secure Socket Layer (SSL) protocols. The token server 130 decrypts the secure payment token to obtain the PAN, and transmits the PAN to the issuer server 125 over the secure connection 17 to allow the issuer server 125 to continue with settlement of the transaction by sending funds for the transaction to the merchant's account at the acquirer server 115.

According to some embodiments, when the token server 130 receives a request from an issuer server 125 to de-tokenize a secure payment token, the token server 130 makes a determination of whether or not to honor the de-tokenization request based on a risk of de-tokenizing the secure payment token. In some embodiments, the token server 130 may generate a metric indicative of a risk of de-tokenizing the secure payment token, and compare the metric to a predetermined threshold. The token server 130 may determine whether or not to honor the de-tokenization request based on the result of the comparison.

In some cases, the token server may obtain a location of the mobile terminal 105 that presented the secure payment token, and the metric may be based, at least in part, on the two location of the mobile terminal 105. The location of the mobile terminal may be a precise location, such as a location identified by GPS coordinates, or a coarse location, such as a location obtained using geolocation based on an IP address. The metric may change based on the location of the mobile terminal. For example, a user of the mobile terminal may specify that the mobile terminal may be used to conduct tokenized transactions only within a defined geographic area. If the location of the mobile terminal 105 does not correspond to the defined geographic area, the metric may be changed to reflect a higher security risk associated with de-tokenization.

In some cases, the token server may obtain a location of the mobile terminal 105 that presented the secure payment token and the location of the POS terminal 110 at which the transaction is being conducted, and the metric may be based, at least in part, on a comparison of the two locations. The locations may be precise locations, such as locations identified by GPS coordinates, or coarse locations, such as locations obtained using geolocation based on an IP address.

In some embodiments, the token server may obtain a geographic location of a communication network, such as a local area network, metropolitan area network, mobile communication network, or other similar network, to which the mobile terminal and/or the POS terminal is connected. The locations of the networks may be compared, and the metric may be based, at least in part, on a comparison of the locations of the networks.

As noted above, when geolocation is used to obtain the location of a mobile terminal or a POS terminal, the location may be unreliable due to the use of VPN or other remote IP address granting services.

In some embodiments, if the locations of the mobile terminal, the POS terminal and/or the communications networks to which one or both of the mobile terminal and the POS terminal are connected do not match, the token server 130 may decline to honor the de-tokenization request. In other embodiments, if the locations do not match, the token server 130 may obtain additional authorization of the transaction from a user of the mobile terminal. The additional authorization may be obtained in one of several ways, such as by having a user of the mobile device enter a shared secret, such as a password or passphrase, having the user of the mobile device respond to a short message service (SMS) message, or having the mobile device user obtain and enter a time limited passcode. Various services are available for generating random time limited passcodes that can be used for verification.

Although FIG. 1 illustrates a block diagram for facilitating secure payment transactions via tokenization and de-tokenization according to some embodiments of the inventive subject matter, it will be understood that embodiments of the present invention are not limited to such configurations, but are intended to encompass any configuration capable of carrying out the operations described herein.

Figure 2:
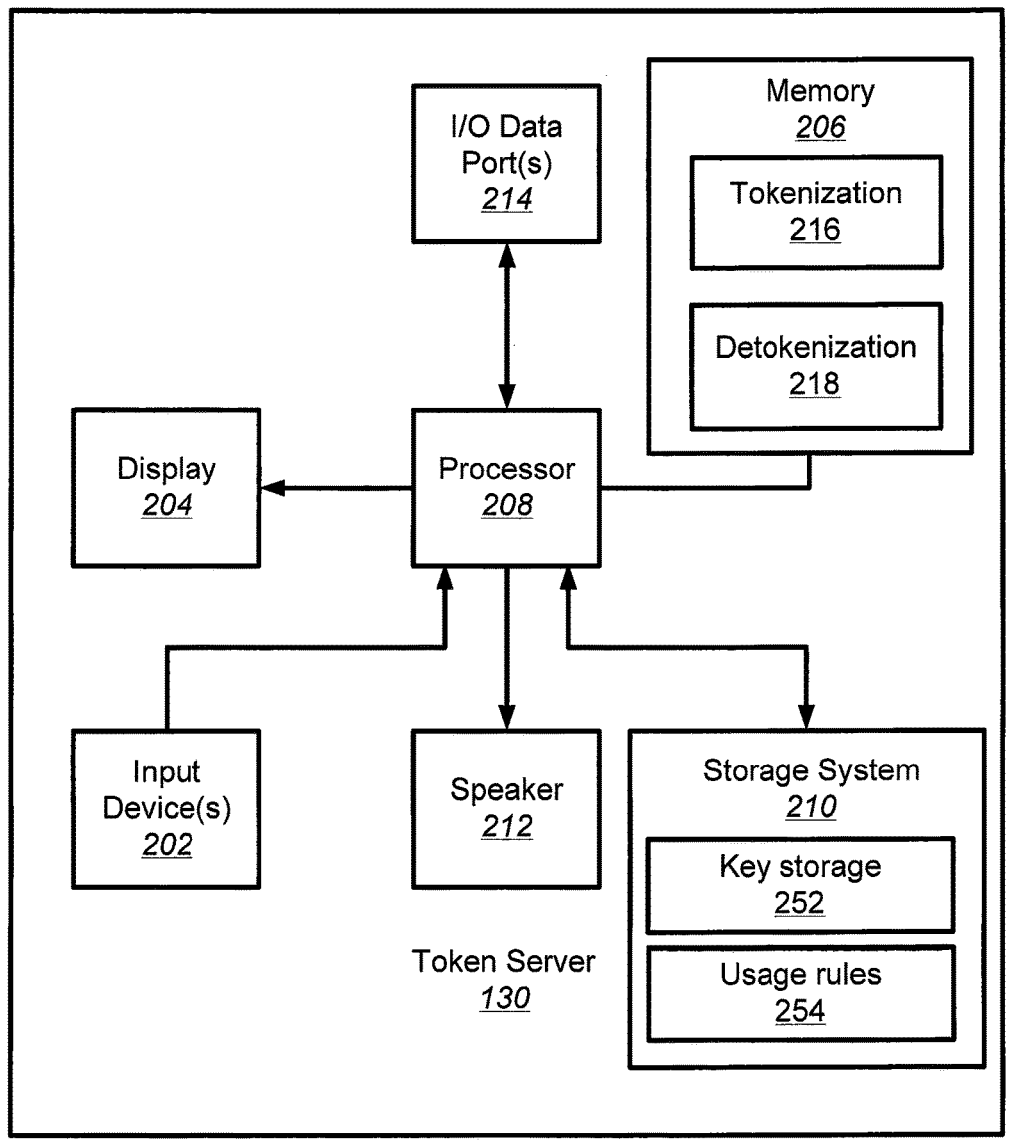
FIG. 2 illustrates a token server that may be used to implement the token server of FIG. 1 in accordance with some embodiments of the inventive subject matter.

Referring now to FIG. 2, a token server 130 in accordance with some embodiments of the inventive subject matter, comprises input device(s) 202, such as a keyboard or keypad, a display 204, and a memory 206 that communicate with a processor 208. The token server 130 may further include a storage system 210, a speaker 212, and an input/output (I/O) data port(s) 214 that also communicate with the processor 208. The storage system 210 may include removable and/or fixed media, such as hard disks, memory cards, or the like, semiconductor memory, such as RAM, NVRAM, etc., as well as virtual storage. The I/O data port(s) 214 may be used to transfer information between the token server 130 another computer system or a network (e.g., the Internet). These components may be conventional components, such as those used in many conventional computing devices, and their functionality, with respect to conventional operations, is generally known to those skilled in the art. The memory 206 may be configured with a tokenization module 216 that may be configured to communicate with the mobile device 105 to encrypt a PAN to generate a secure payment token as described above according to some embodiments of the inventive subject matter. The memory 206 may further be configured with a de-tokenization module 218 that may be configured to communicate with the issuer server 125 and to decrypt a secure payment token to obtain the original PAN according to some embodiments of the inventive subject matter.

The storage system 210 may include a key storage that stores encryption keys used to generate secure payment tokens. The encryption keys may be used to de-tokenize secure payment tokens in order to recover PANs. The storage system 210 may in some embodiments also store PANs and/or secure payment keys associated with PANs in secure storage.

The storage system 210 may also store usage rules 254 that can be used in evaluating a risk of de-tokenizing a secure payment token as described in more detail below.

Figure 3:
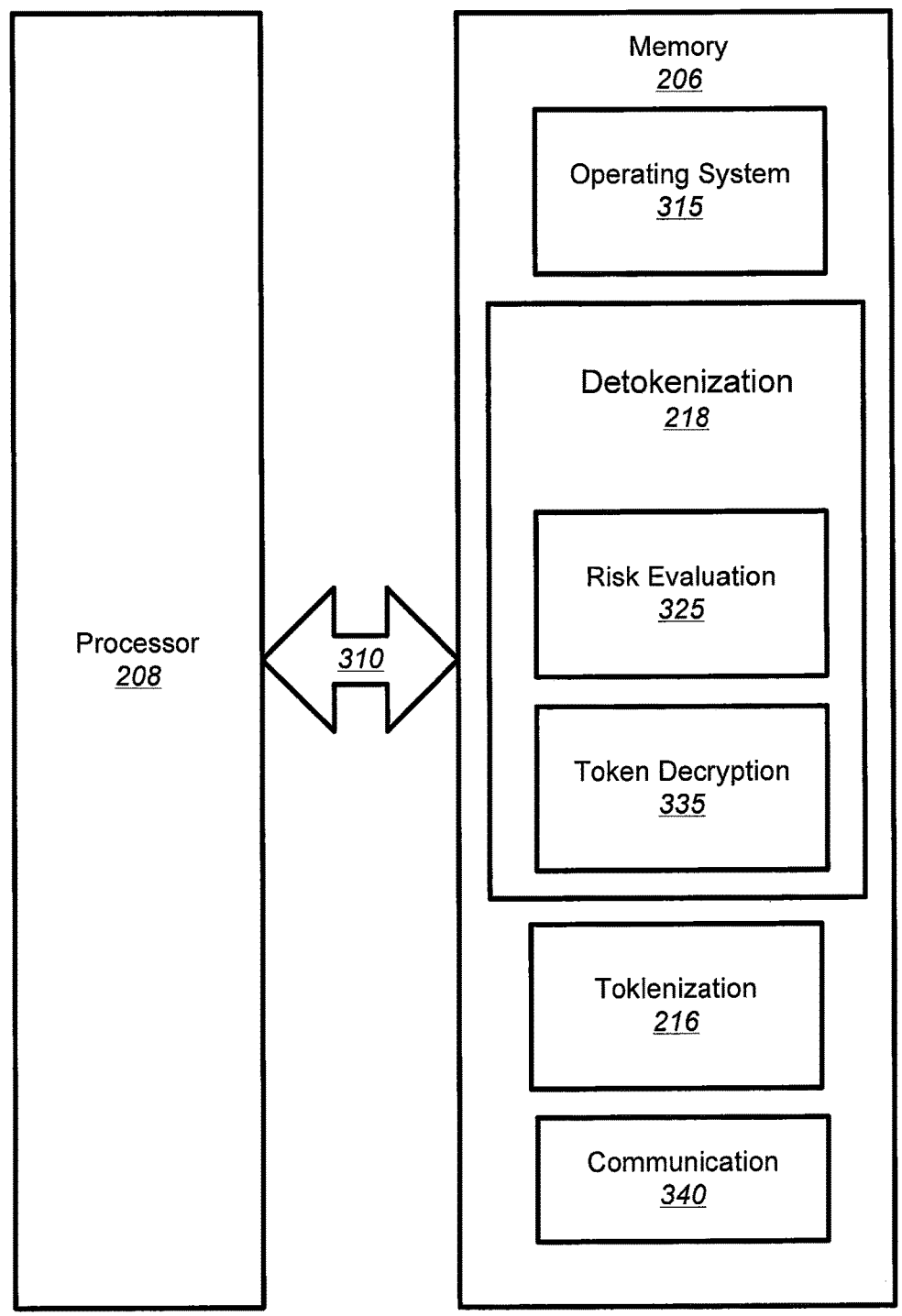
FIG. 3 is a block diagram that illustrates a software/hardware architecture for the token server of FIG. 2 in accordance with some embodiments of the present inventive subject matter.

FIG. 3 illustrates a processor 300 and memory 305 that may be used in embodiments of data processing systems, such as the token server 130, for facilitating secure payment transactions via tokenization using FPE in accordance with some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for facilitating secure payment transactions via tokenization using FPE in accordance with some embodiments of the inventive subject matter. The memory 305 may include, but is not limited to, the following types of devices: cache, RAM, ROM, PROM, EPROM, EEPROM, flash, SRAM, and DRAM.

As shown in FIG. 3, the memory 305 may contain up to two or more categories of software and/or data: an operating system 315, a tokenization module 216, a de-tokenization module 218 and a communication module 340. The operating system 315 generally controls the operation of the data processing system. In particular, the operating system 315 may manage the data processing system's software and/or hardware resources and may coordinate execution of programs by the processor 300. The tokenization module 320 generates a secure payment token based on a PAN provided by a user of a mobile terminal 105. The secure payment token may be generated by encrypting the PAN using an encryption key known only to the token server 130. The encryption key, the secure payment token and the PAN may be stored on the token server 130. In some embodiments, only the encryption key and the secure payment token may be stored on the token server 130.

The communication module 340 may be configured to facilitate communication between the token server 130 and the mobile device 105 in order to support the generation and distribution of a secure payment token to the mobile device 105, as well as to obtain a geographic location associated with the mobile device 105 at the time of a transaction. The communication module 340 may also be configured to receive the secure payment token and to send the PAN back to the issuer server 125 after the secure payment token is decrypted.

The de-tokenization module 218 may be configured to decrypt the secure payment token received from the issuer server 125 to obtain the PAN. The de-tokenization module 218 may include a risk evaluation module 325 and a token decryption module 335.

When a secure payment token is received by the token server 130 from the issuer server 125 along with a de-tokenization request, before the secure payment token is decrypted to obtain the PAN, the risk evaluation module 325 may evaluate the risk of de-tokenizing the secure payment token. In particular, as described above, the risk evaluation module 325 may generate a metric indicative of a risk of de-tokenizing the secure payment token, and compare the metric to a predetermined threshold. The risk evaluation module 325 determines whether or not to honor the de-tokenization request based on the result of the comparison.

In some cases, risk evaluation module 325 may obtain a location associated with the mobile terminal 105 that presented the secure payment token and a location associated with the POS terminal 110 at which the transaction is being conducted, and the metric may be based, at least in part, on a comparison of the two locations. The locations may be precise locations, such as locations identified by GPS coordinates, or coarse locations, such as locations obtained using geolocation based on an IP address.

Thus, in some embodiments, the de-tokenization request may include a geographic location associated with the POS terminal 110 at which the transaction is being conducted. The risk evaluation module 325 may obtain a location associated with the mobile terminal 105 by communicating directly with the mobile terminal 105 to obtain a precise GPS location of the mobile terminal 105 directly from the mobile terminal 105. Alternatively, the risk evaluation module 325 may use a geolocation technique based on a network address of the mobile terminal 105 to obtain a coarse location of the mobile terminal 105.

In some embodiments, the token server may obtain a geographic location of a communication network, such as a local area network, metropolitan area network, mobile communication network, or other similar network, to which the mobile terminal 105 and/or the POS terminal 110 is connected. The locations of the networks may be compared, and the metric may be based, at least in part, on a comparison of the locations of the networks.

The risk evaluation performed by the risk evaluation module 325 may be based on factors other than the geographic locations of the mobile terminal and/or the POS terminal that conduct the transaction in which the secure payment token is provided. For example, a user of the mobile terminal may establish usage rules, or boundaries, for secure payment tokens. The usage rules may be stored by the token server in the usage rules storage 254 (FIG. 2). Usage rules may govern the number of secure payment tokens that can be redeemed by a user within a particular period of time, transaction amount limits for transactions using secure payment tokens, geographical restrictions on the use of secure payment tokens, and the like. The usage rules may also be generated programmatically based on past behavior by a particular user. For example, a transaction that is for an amount significantly greater than the average transaction amount associated with a particular user/mobile device may be assigned a higher risk, a transaction that is initiated in an unfamiliar or previously unused location may be assigned a higher risk, etc.

In some embodiments, the de-tokenization request may include a transaction amount associated with the transaction, and the risk evaluation module 325 may compare the transaction amount to a predetermined transaction amount threshold associated with the mobile terminal. In some embodiments, the risk evaluation module 325 may determine a number of transactions associated with the mobile terminal in a predetermined time frame and compare the number of transactions associated with the mobile terminal in the predetermined time frame to a predetermined transaction frequency threshold associated with the mobile terminal.

Other factors that may contribute to the risk metric may include a merchant ID of the merchant associated with the transaction, a merchant category associated with the merchant, a previous transaction history, and transaction date/time. Other parameters may also be used.

Depending on the risk metric associated with fulfilling the de-tokenization request, additional confirmation of the transaction may be obtained, for example, from a user of the mobile terminal. For example, the token server send a message to the mobile terminal requesting entry of a passcode or other confirmation of the transaction. Other actions that may be taken based on the risk metric include blocking the PAN and/or the mobile device from further use in online transactions, and/or erasing mobile application data off of the device to prevent further fraudulent transactions. For example, other tokens stored on the device may be deleted.

Accordingly, a token server 130 that is presented with a secure payment token for which de-tokenization is requested may perform a risk evaluation based on a number of factors, including but not limited to geographic locations associated with a mobile terminal and a POS terminal at which the transaction is conducted, usage rules associated with a user to which the secure payment token was issued, and/or prior activity of a user to which the secure payment token was issued. Security of the PAN of the user may thereby be enhanced.

If the risk evaluation module 325 determines that a risk threshold of fulfilling the de-tokenization request is exceeded, the risk evaluation module 325 may inform the de-tokenization module 218 of this result, and the de-tokenization module 218 may deny the de-tokenization request or obtain additional confirmation of the validity of the request, such as by requiring the mobile terminal 105 to provide a passcode or confirmation code.

Although FIG. 3 illustrates hardware/software architectures that may be used in data processing systems, such as the token server 130 of FIG. 1 and FIG. 2, for facilitating secure payment transactions, according to some embodiments of the inventive subject matter, it will be understood that the present invention is not limited to such a configuration but is intended to encompass any configuration capable of carrying out operations described herein.

Figure 4:
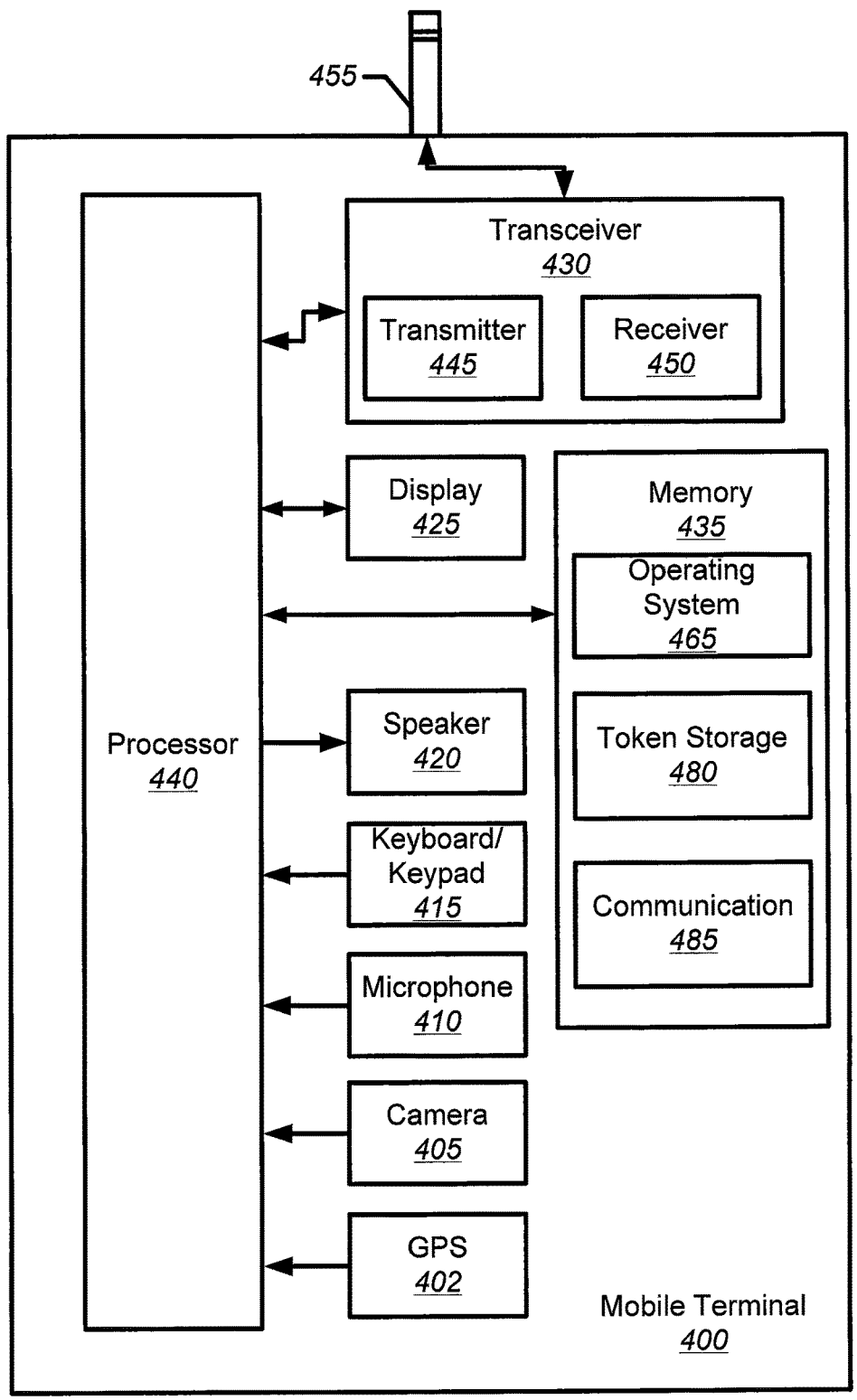
FIG. 4 is a block diagram that illustrates a mobile device/terminal that may be utilized in connection with some embodiments of the present inventive subject matter.

Referring now to FIG. 4, an exemplary mobile terminal 400 that may be used to implement the mobile device 105 of FIG. 1, in accordance with some embodiments of the inventive subject matter, includes a GPS module 402, a camera 405, a microphone 410, a keyboard/keypad 415, a speaker 420, a display 425, a transceiver 430, and a memory 435 that communicate with a processor 440. The transceiver 430 comprises a transmitter circuit 445 and a receiver circuit 450, which respectively transmit outgoing radio frequency signals to base station transceivers and receive incoming radio frequency signals from the base station transceivers via an antenna 455. The radio frequency signals transmitted between the mobile terminal 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 400 may be included in many conventional mobile terminals and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used to facilitate secure payment transactions via tokenization using FPE, in accordance with some embodiments of the present invention. The memory 435 may include, but is not limited to, the following types of devices: cache, ROM, PROM, EPROM, EEPROM, flash, SRAM, and DRAM.

As shown in FIG. 4, the memory 435 may contain a plurality of modules, including an operating system 465, a token storage module 480, and a communication module 485. The operating system 465 generally controls the operation of the mobile terminal 400. In particular, the operating system 465 may manage the mobile terminal's software and/or hardware resources and may coordinate execution of programs by the processor 440.

Although FIG. 4 illustrates an exemplary software and hardware architecture that may be used to provide a mobile terminal that can facilitate secure payment transactions via tokenization according to some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 1-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the mobile device 105 of FIG. 1, the token server 130 of FIG. 1 or FIG. 2, the hardware/software architecture of FIG. 3, and the mobile terminal of FIG. 4 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Figure 5:
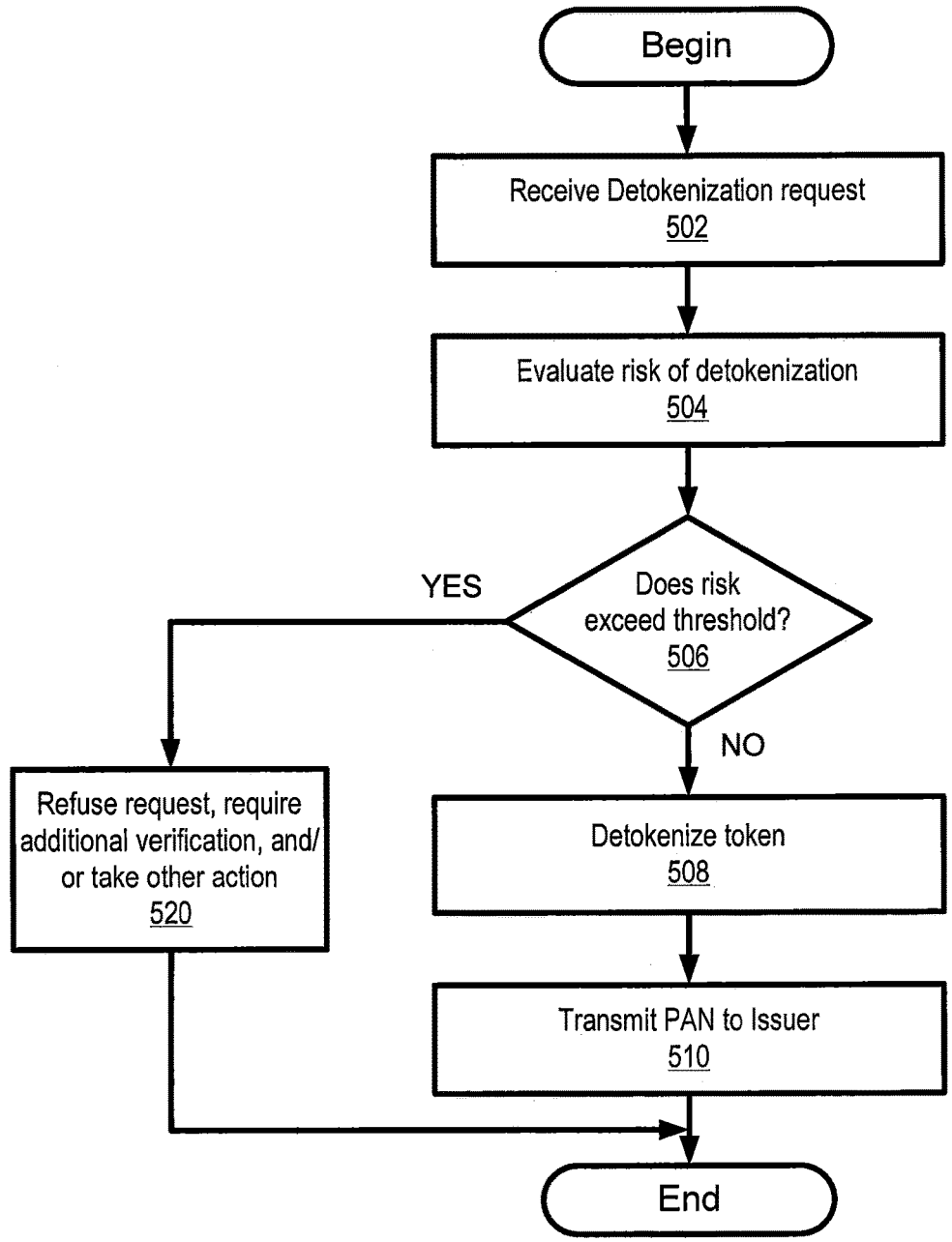
FIGS. 5 and 6 are flowcharts that illustrate operations of a token server for facilitating secure payment transactions via tokenization in accordance with some embodiments of the inventive subject matter.
Figure 6:
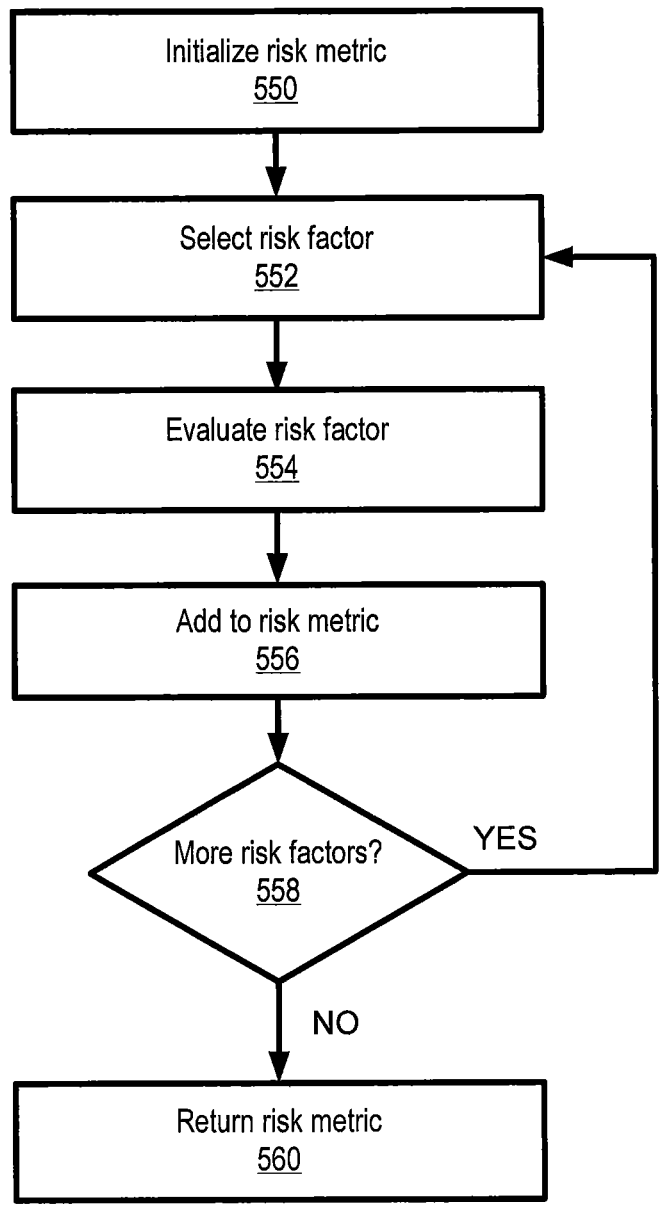
Figure 7:
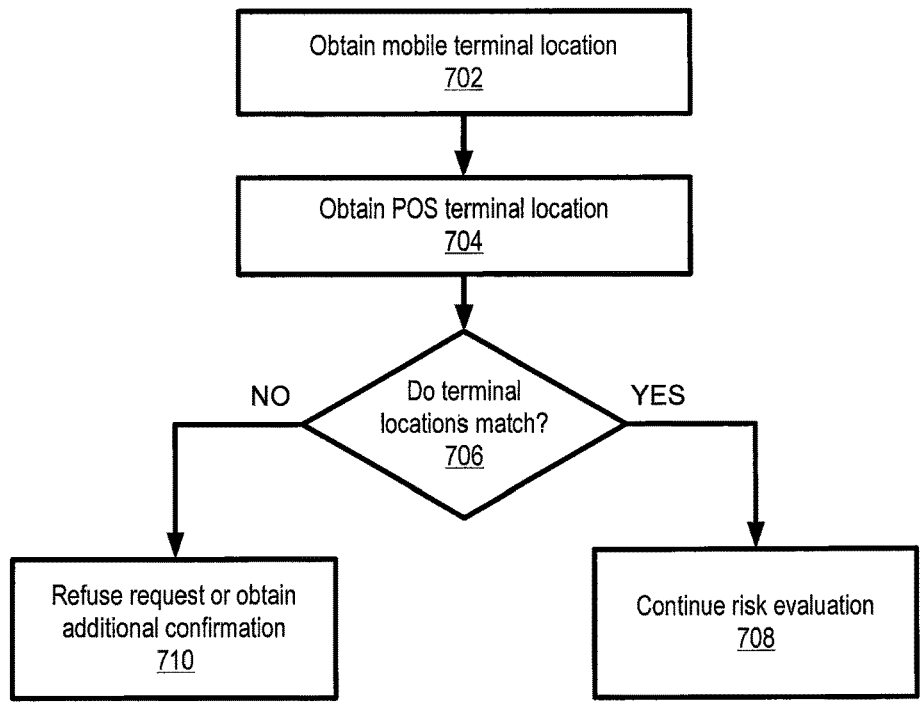
FIGS. 7 and 8 are flowcharts that illustrate operations of a token server for facilitating secure payment transactions via tokenization in accordance with further embodiments of the inventive subject matter.

FIGS. 5, 6 and 7 are flowcharts that illustrate operations for facilitating secure payment transactions via tokenization in accordance with some embodiments of the inventive subject matter. Referring now to FIG. 5, operations of a token server, such as token server 130, begin at block 402 where the token server 130 receives a de-tokenization request from an issuer server 125 (block 502). The de-tokenization request may include a secure payment token and an indication of a geographic location associated with a POS terminal that is conducting the transaction at which the secure payment token was received. The token server 130 evaluates a risk associated with de-tokenizing the secure payment token (block 504). For example, the token server 130 may generate a metric that represents a risk associated with de-tokenizing the secure payment token. At block 506, the token server determines if the metric that represents the risk associated with de-tokenizing the secure payment token exceeds a predetermined threshold. If the metric exceeds the predetermined threshold, the token server 130 may refuse the de-tokenization request and/or obtain additional confirmation of the request before fulfilling the de-tokenization request, or refuse the de-tokenization request, or take other actions, such as blocking the PAN, erasing data from the mobile device, etc. (block 520).

Alternatively, if the metric is less than the predetermined threshold, the token server 408 may de-tokenize the secure payment token, for example, by decrypting the secure payment token to obtain a PAN associated with the secure payment token (block 508) and transmit the PAN to the issuer server 125 (block 510).

Generation of the risk metric by the token server 130 is illustrated in FIG. 6. As noted above, a number of risk factors, such as location of the mobile device, transaction amount, transaction history, etc., may be evaluated in determining the risk metric. Accordingly, to generate the risk metric, the token server 130 may first initialize the risk metric (block 550). For example, the token server 130 may set the risk metric to zero. The token server 130 then selects a risk factor (block 552) and evaluates the risk factor (block 554). As a result of evaluating the risk factor, the token server 130 may assign a numerical value to the risk factor. That numerical value is added to the risk metric (block 556).

The token server 130 then checks to see if there are any other risk factors left to evaluate (block 558). If so, operations return to block 552, where the token server 130 selects the next risk factor to evaluate. Otherwise, the risk metric is returned (block 560).

As an example, a token server 130 receives a de-tokenization request for a transaction. The de-tokenization request may include a merchant ID associated with the transaction, a date/time stamp, and a transaction amount. The token server may determine the location of a mobile device that supplied the payment token. The token server 130 may then generate a metric by assigning a numerical value to each risk factor, and summing the numerical values to obtain a risk metric. The risk metric is then compared to a predetermined threshold, and a predetermined action is taken in response to the comparison.

In some cases, the token server 130 may not have enough information to evaluate all available risk factors. For example, the token server 130 may not be able to obtain a geographic location of the mobile terminal, a merchant ID may be unavailable, etc. In some embodiments, the token server 130 may assign a nominal value to risk factors that cannot be evaluated. In some cases, the nominal value may be a predicted value, an average value, a maximum value, or zero, depending on the relative importance of the risk factor.

In one example, a token server 130 may be configured to generate a risk metric by evaluating four risk factors: terminal location, merchant ID, transaction time, and transaction amount. In the example, the token server may assign the following numerical values to the risk factors:

TABLE 1

Risk Factor Evaluation

| Risk Factor | Value |
|---|---|
| Terminal Location | 4 |
| Merchant ID | 6 |
| Transaction time | 2 |
| Transaction amount | 5 |

It will be appreciated that the risk factors and values shown in Table 1 are examples only, and that other risk factors and/or values may be used.

The risk metric may be calculated as the sum of the assigned values, or in this example, 17. The risk metric is then compared to a threshold, or range of thresholds, to determine whether or not to honor the de-tokenization request and what other actions, if any, should be taken. For example, if the predetermined threshold is 20, then the token server 130 may fulfill the de-tokenization request.

In some embodiments, any one of a plurality actions can be taken by the token server in response to the risk metric. For example, the following table shows a range of actions that can be taken depending on the level of risk:

TABLE 2

Risk Metric Thresholds

| Risk Metric | Risk Level | Action |
|---|---|---|
| <20 | Low | Fulfill de-tokenization request |
| 21-40 | Medium | Require additional confirmation before fulfilling request |
| 41-60 | Increased | Deny de-tokenization request |
| >61 | Maximum | Deny de-tokenization request, erase tokenization data from mobile device and block PAN from further use in tokenized transactions |

It will be appreciated that the threshold values, risk level designations and actions shown in Table 2 are examples only, and that other threshold values, risk level designations and/or actions may be used.

Further operations of a token server 130 illustrated in FIG. 7. In particular, FIG. 7 illustrates operations that a token server 130 may execute to determine the risk associated with de-tokenizing the secure payment token. In particular, the token server 130 may obtain a location associated with a mobile terminal that supplied the secure payment token as part of a transaction (block 702). The location associated with the mobile terminal may be obtained directly from the mobile terminal, such as by requesting GPS coordinates directly from the mobile terminal or by requesting information from the mobile terminal about a network to which the mobile terminal is connected. Alternatively, the token server 130 may use a geolocation service to determine an approximate location of the mobile terminal based on a network address, such as an IP address, of the mobile terminal.

The token server 130 may then obtain a location associated with a POS terminal that received the secure payment token from the mobile terminal (block 704). The location associated with the POS terminal that received the secure payment token from the mobile terminal may be provided as part of the de-tokenization request.

The token server 130 may then compare the location associated with the mobile terminal with the location associated with the POS terminal, and determine if the locations match (block 706). If the locations do not match, the token server may refuse the de-tokenization request or require additional confirmation before fulfilling the de-tokenization request (block 710). If the locations do match, the token server 130 may continue with the risk evaluation process (block 708).

Figure 8:
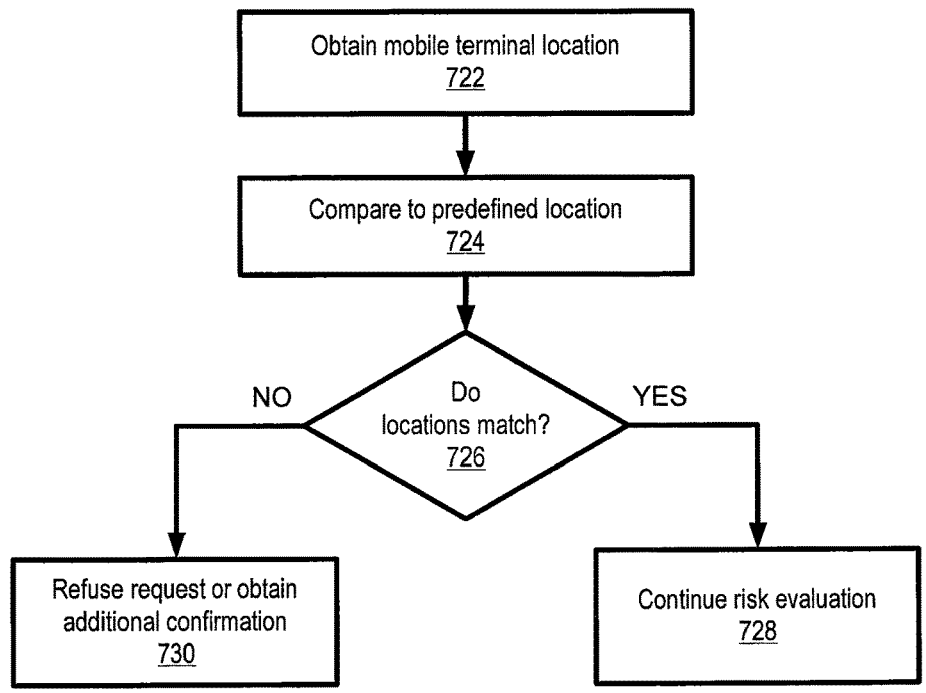

Further operations of a token server 130 illustrated in FIG. 8. In particular, FIG. 7 illustrates further operations that a token server 130 may execute to determine the risk associated with de-tokenizing the secure payment token. In particular, the token server 130 may obtain a location associated with a mobile terminal that supplied the secure payment token as part of a transaction (block 722). The location associated with the mobile terminal may be obtained directly from the mobile terminal, such as by requesting GPS coordinates directly from the mobile terminal or by requesting information from the mobile terminal about a network to which the mobile terminal is connected. Alternatively, the token server 130 may use a geolocation service to determine an approximate location of the mobile terminal based on a network address, such as an IP address, of the mobile terminal.

The token server 130 may then identify a predefined geographic location in which the mobile terminal is authorized to conduct tokenized transactions (block 724).

The token server 130 may then compare the location associated with the mobile terminal with the predefined location, and determine if the locations match (block 726).

If the locations do not match, the token server may refuse the de-tokenization request or require additional confirmation before fulfilling the de-tokenization request (block 730). If the locations do match, the token server 130 may continue with the risk evaluation process (block 728).

As noted above, the risk evaluation performed by the token server may be based on factors other than the geographic locations of the mobile terminal and/or the POS terminal that conduct the transaction in which the secure payment token is provided. For example, a user of the mobile terminal may establish usage rules, such as the usage rules stored by the token server in the usage rules storage 254 (FIG. 2). Usage rules may govern the number of secure payment tokens that can be redeemed by a user within a particular period of time, transaction amount limits for transactions using secure payment tokens, geographical restrictions on the use of secure payment tokens, and the like.

In some embodiments, the de-tokenization request may include a transaction amount associated with the transaction, and generating the metric may include comparing the transaction amount to a predetermined transaction amount threshold associated with the mobile terminal. In some embodiments, generating the metric may include determining a number of transactions associated with the mobile terminal in a predetermined time frame and comparing the number of transactions associated with the mobile terminal in the predetermined time frame to a predetermined transaction frequency threshold associated with the mobile terminal.

If the metric indicates that there is a risk associated with fulfilling the de-tokenization request, additional confirmation of the transaction may be obtained, for example, from a user of the mobile terminal. For example, the token server send a message to the mobile terminal requesting entry of a passcode or other confirmation of the transaction.

Accordingly, a token server 130 that is presented with a secure payment token for which de-tokenization is requested may perform a risk evaluation based on a number of factors, including but not limited to geographic locations associated with a mobile terminal and a POS terminal at which the transaction is conducted, usage rules associated with a user to which the secure payment token was issued, and/or prior activity of a user to which the secure payment token was issued.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
    performing operations as follows on a processor of a computing device operating as a token server of a payment communication network:
    receiving a request, from an issuer data processing system of the communication network, to de-tokenize a secure payment token associated with a transaction conducted using a mobile terminal operating in the payment communication network;
    obtaining a first geographic location of the mobile terminal;
    obtaining a second geographic location associated with a location of a point of sale terminal of the payment communication network associated with the transaction conducted using the mobile terminal;
    determining usage rules for secure payment tokens associated with the mobile terminal based on a transaction history associated with a user of the mobile terminal
    generating a metric indicative of a risk of de-tokenizing the secure payment token based on a comparison of the first geographic location to the second geographic location and the determined usage rules;
    comparing the metric indicative of the risk of de-tokenizing the secure payment token to a predetermined threshold; and
    transmitting, to the issuer data processing system, a response to the request to de-tokenize the secure payment token, wherein the response to the request is based on the comparison of the metric indicative of the risk of de-tokenizing the secure payment token with the predetermined threshold.

2. The method of claim 1, wherein obtaining the second geographic location comprises obtaining the second geographic location from the issuer data processing system.

3. The method of claim 1, further comprising:
    obtaining a third geographic location associated with a communications network to which the mobile terminal is connected; and
    comparing the first geographic location, the second geographic location and the third geographic location, wherein generating the metric comprises generating the metric in response to the comparison of the first geographic location, the second geographic location and the third geographic location.

4. The method of claim 1, further comprising:
    transmitting a confirmation request to the mobile terminal for a confirmation of the transaction conducted by the mobile terminal;
    receiving a confirmation response from the mobile terminal; and
    verifying the transaction in response to the confirmation response from the mobile terminal.

5. The method of claim 4, wherein the confirmation response from the mobile terminal comprises a time limited passcode.

6. The method of claim 4, wherein the confirmation response from the mobile terminal comprises a shared secret.

7. The method of claim 1, wherein the request comprises a transaction amount associated with the transaction, and wherein generating the metric comprises comparing the transaction amount to a predetermined transaction amount threshold associated with the mobile terminal.

8. The method of claim 1, wherein generating the metric comprises determining a number of transactions associated with the mobile terminal in a predetermined time frame and comparing the number of transactions associated with the mobile terminal in the predetermined time frame to a predetermined transaction frequency threshold associated with the mobile terminal.

9. A computer program product, comprising:
a tangible computer readable storage medium comprising computer readable program code embodied in the medium that when executed by a processor of a computing device operating as a token server of a payment communication network, causes the processor to perform operations comprising:
receiving a request, from an issuer data processing system of the communication network, to de-tokenize a secure payment token associated with a transaction conducted using a mobile terminal operating in the payment communication network;
obtaining a first geographic location of the mobile terminal;
obtaining a second geographic location associated with a location of a point of sale terminal of the payment communication network associated with the transaction conducted using the mobile terminal;
determining usage rules for secure payment tokens associated with the mobile terminal based on a transaction history associated with a user of the mobile terminal
generating a metric indicative of a risk of de-tokenizing the secure payment token based on a comparison of the first geographic location to the second geographic location and the determined usage rules;
comparing the metric indicative of the risk of de-tokenizing the secure payment token to a predetermined threshold; and
transmitting, to the issuer data processing system, a response to the request to de-tokenize the secure payment token, wherein the response to the request is based on the comparison of the metric indicative of the risk of de-tokenizing the secure payment token with the predetermined threshold.

10. The computer program product of claim 9, wherein obtaining the second geographic location comprises obtaining the second geographic location from the issuer data processing system.

11. The computer program product of claim 9, wherein the operations further comprise:
obtaining a third geographic location associated with a communications network to which the mobile terminal is connected; and
comparing the first geographic location, the second geographic location and the third geographic location, wherein generating the metric comprises generating the metric in response to the comparison of the first geographic location, the second geographic location and the third geographic location.

12. The computer program product of claim 9, wherein the operations further comprise:
transmitting a confirmation request to the mobile terminal for a confirmation of the transaction conducted by the mobile terminal; and
receiving a confirmation response from the mobile terminal; and
verifying the transaction in response to the confirmation response from the mobile terminal;
wherein transmitting a response to the request to de-tokenize the secure payment token comprises transmitting the response in response to verifying the transaction.

13. The computer program product of claim 9, wherein the request comprises a transaction amount associated with the transaction, and wherein generating the metric comprises comparing the transaction amount to a predetermined transaction amount threshold associated with the mobile terminal.

14. The method of claim 1, wherein the response comprises a de-tokenized secure payment token or a request for additional authorization of the transaction from a user of the mobile terminal.

15. The method of claim 1, wherein the response declines to process the request to de-tokenize the secure payment token.

16. The method of claim 1, further comprising:
receiving, from a user of the mobile terminal, usage rules for secure payment tokens associated with the mobile terminal; and
wherein generating the metric further comprises generating the metric based on the usage rules received from the user of the mobile terminal.

* * * * *